United States Patent
Hsu

(10) Patent No.: US 9,307,096 B2
(45) Date of Patent: Apr. 5, 2016

(54) MOBILE POWER DEVICE HAVING BORDER CASING

(71) Applicant: Powergene Technology Co., Ltd., Taiwan Branch, New Taipei (TW)

(72) Inventor: Hui-Te Hsu, New Taipei (TW)

(73) Assignee: POWERGENE TECHNOLOGY CO., LTD., TAIWAN BRANCH, New Taipei (TW)

( * ) Notice: Subject to any disclaimer, the term of this patent is extended or adjusted under 35 U.S.C. 154(b) by 0 days.

(21) Appl. No.: 14/468,648

(22) Filed: Aug. 26, 2014

(65) Prior Publication Data

US 2016/0065750 A1    Mar. 3, 2016

(51) Int. Cl.
  H04B 1/38       (2015.01)
  H04M 19/08   (2006.01)
  H04B 1/3888   (2015.01)

(52) U.S. Cl.
  CPC .............. *H04M 19/08* (2013.01); *H04B 1/3888* (2013.01)

(58) Field of Classification Search
  CPC .. H04B 1/3883; H04B 1/3833; H04M 1/0214
  USPC ............................... 455/90.3, 575.1, 572, 573
  See application file for complete search history.

(56) References Cited

U.S. PATENT DOCUMENTS

| | | | |
|---|---|---|---|
| 7,711,400 B2 * | 5/2010 | Nuovo | H01H 13/70 455/575.8 |
| 7,832,565 B2 * | 11/2010 | Sasaki | H01M 2/1044 206/703 |
| 8,805,456 B1 * | 8/2014 | Hardy | H02J 7/025 455/41.1 |
| 2004/0023684 A1 * | 2/2004 | Sato | H04M 1/0218 455/550.1 |
| 2015/0194839 A1 * | 7/2015 | Wojcik | H02J 7/025 320/108 |

* cited by examiner

*Primary Examiner* — April G Gonzales
(74) *Attorney, Agent, or Firm* — Chun-Ming Shih; HDLS IPR SERVICES

(57) ABSTRACT

A mobile power device includes a mobile power source and a border casing. The mobile power source includes a housing, and the housing has a top plate and an annular plate. The border casing encloses the annular plate. An inner circumference of the border casing has a surrounding block surroundingly disposed around the top plate. The surrounding block protrudes beyond the top plate, and a gap is formed between the surrounding block and the top plate. Therefore, the surrounding block can restrict a position of a portable electronic product, so that the portable electronic product is securely disposed corresponding to the mobile power source to enhance the convenience in using the mobile power device.

8 Claims, 6 Drawing Sheets

MOBILE POWER DEVICE HAVING BORDER CASING

BACKGROUND

1. Technical Field

The present invention relates to a mobile power device and, in particular, to a mobile power device having a border casing.

2. Related Art

A traditional mobile power device stores power in advance, and then is electrically connected, via a transmission cable, to a portable electronic product such as a mobile phone, a digital camera, a PDA, or a notebook, so as to transmit power stored in the mobile power device to the portable electronic product. However, it is not easy to carry along the transmission cable and is inconvenient for use.

Accordingly, a wireless mobile power device appeared in the market, which utilizing an electromagnetical induction principal. When the portable electronic product is placed on a surface of the wireless mobile power device, an inductive coil inside the wireless mobile power device can directly charge the portable electronic product without the foregoing transmission cable.

However, all kinds of portable electronic products vary in sizes, and, as a result, the wireless mobile power device has the following defects: first, if a size of the portable electronic product is smaller than a surface of the wireless mobile power device, there is a problem that it is not easy to make the portable electronic product disposed in correspondence to the inductive coil; secondly, if the size of the portable electronic product is larger than the surface of the wireless mobile power device, there is a problem that it is not easy to place the portable electronic product on the wireless mobile power device, both of which reduce the power charging efficiency of the wireless mobile power device.

Additionally, if the traditional wireline mobile power device only uses the transmission cable to connect the portable electronic product, situations like collisions or shakes may cause the transmission cable, the mobile power device, and the portable electronic product to be disconnected from one another. Even worse, the aforesaid situations cause that the mobile power device or the portable electronic product falls to the ground.

In view of the foregoing, the inventor made various studies to improve the above-mentioned problems to realize the improvements, on the basis of which the preset invention is accomplished.

BRIEF SUMMARY

It is an object of the present invention to provide a mobile power device having a border casing, in which a surrounding block is utilized to restrict a position of a portable electronic product, so that the portable electronic product is securely disposed with respect to the mobile power source, thereby enhancing convenience in using the mobile power device.

Accordingly, the present invention provides a mobile power device having a border casing, comprising: a mobile power source including a housing, the housing including a top plate and an annular plate; and a border casing enclosing the annular plate, an inner circumference of the border casing including a surrounding block surroundingly disposed around the top plate, the surrounding block protruding beyond the top plate, a gap being formed between the surrounding block and the top plate.

The present invention also achieve the following effects:

First, when a size of the portable electronic product is smaller than a surface of the mobile power device, the portable electronic product can be placed in the gap and be restricted by the surrounding block. When the size of the portable electronic product is larger than the surface of the mobile power device, the portable electronic product can be sucked to be securely attached to the surrounding block since the surrounding block consists of silicone, rubber, or other soft materials, thereby preventing the mobile power device and the portable electronic product from having ineffective charging or falling to the ground, so as to enhance charging efficiency and the convenience in using the mobile power device.

Secondly, the surrounding block is integrally and extendingly formed from an inner circumference of a surrounding frame, and the border casing consists of silicone, rubber, or other soft materials, so that the air in the gap can be evacuated from around the boarder casing, thereby enhancing the ability of the surrounding block to suck and attach to the portable electronic product.

DETAILED DESCRIPTION

Figure 1:
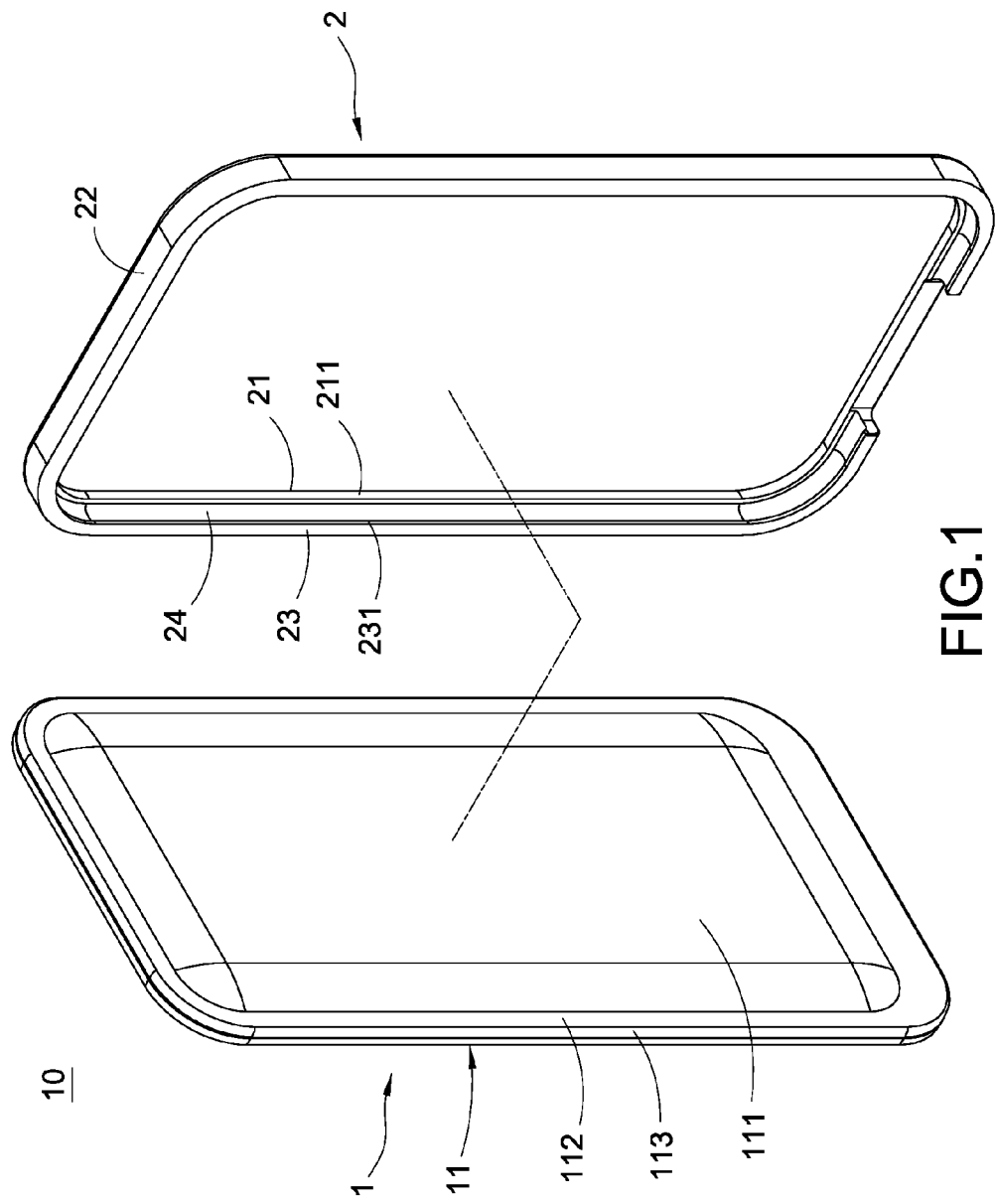
FIG. 1 is a perspective exploded view of a mobile power device according to the present invention.
Figure 2:
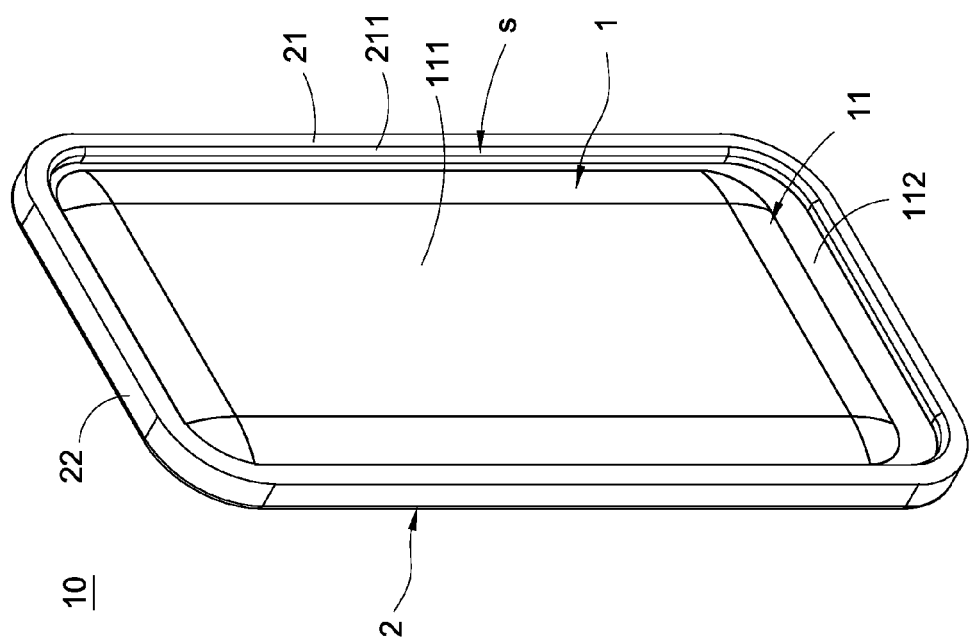
FIG. 2 is a perspective view of a combined state of the mobile power device according to the present invention.
Figure 3:
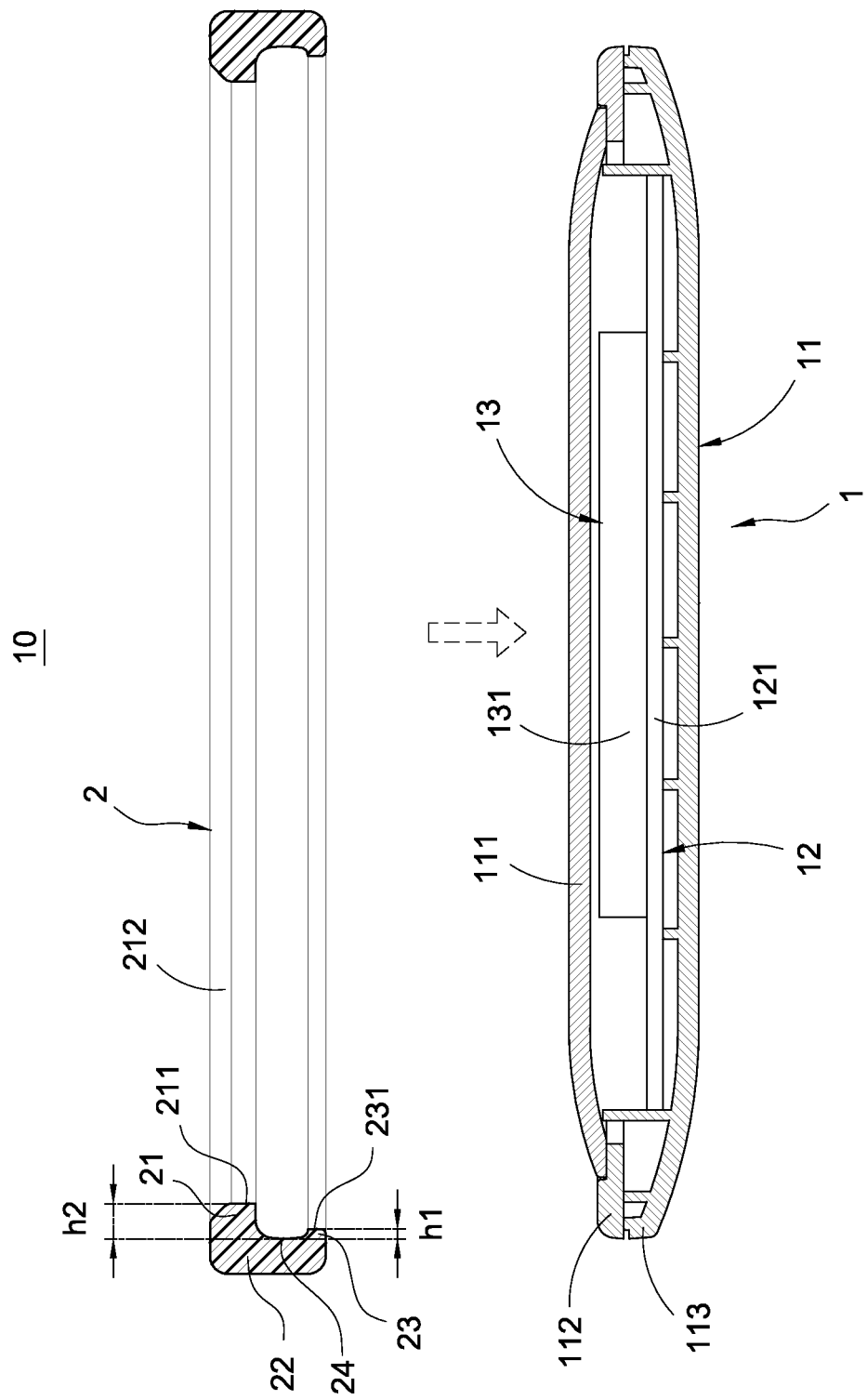
FIG. 3 is a schematic cross sectional view illustrating that a border casing is to engage with the annular plate.
Figure 4:
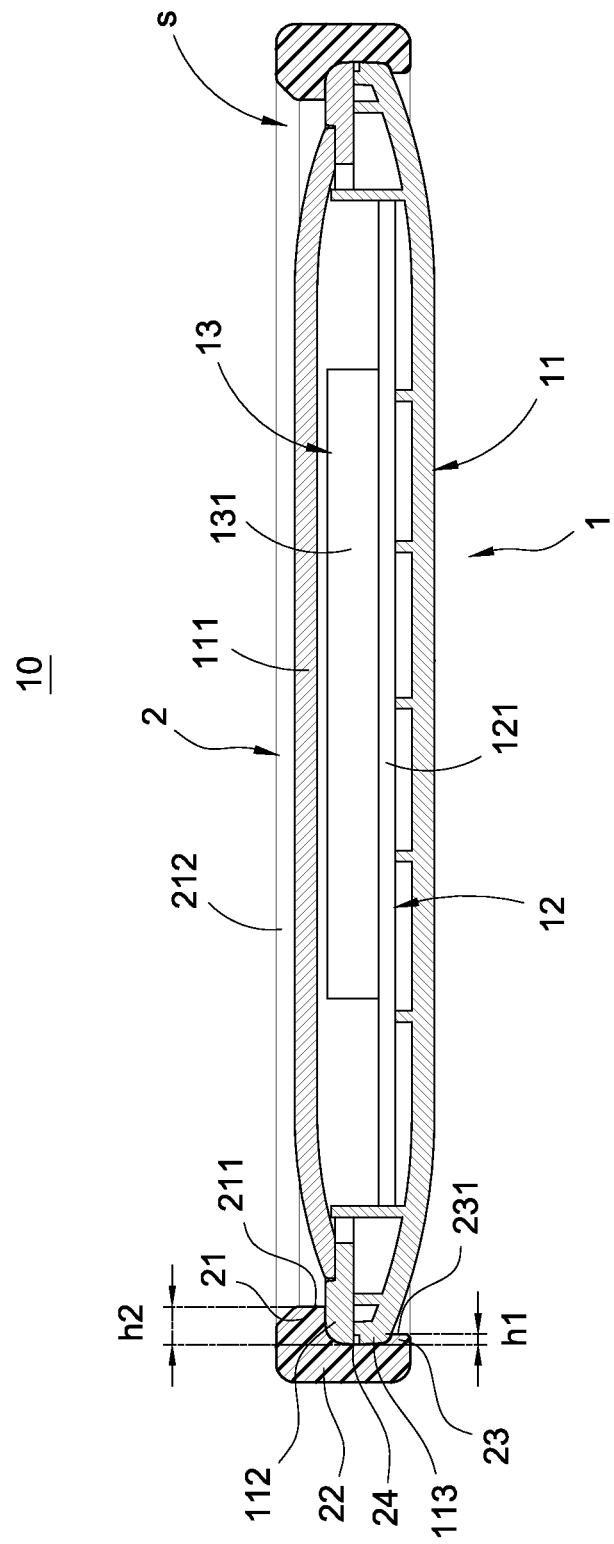
FIG. 4 is a schematic cross sectional view illustrating the border casing engaging with the annular plate.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Please refer to FIGS. 1 to 6, the present invention provides a mobile power device having a border casing. The mobile power device 10 mainly comprises a mobile power source 1 and a border casing 2.

The mobile power source 1 includes a housing 11. The housing 11 includes a top plate 111 and an annular plate 112. The annular plate 112 extendingly forms a protruding annular portion 113. The top plate 111 is an arc-shaped protruding plate.

More details are described as follows. The mobile power source 1 is either a wireline mobile power source or a wireless mobile power source. In the present embodiment, the mobile power source 1 is the wireless mobile power source as an example; however, the present invention is not limited thereto.

Therefore, the mobile power source 1 of the present embodiment further includes a power supply module 12 and a wireless charging module 13. The power supply module 12 and the wireless charging module 13 are accommodated inside the housing 11. The power supply module 12 includes a printed circuit board 121. The wireless charging module 13 includes an inductive coil 131. The inductive coil 131 is electrically connected to the printed circuit board 121.

The border casing 2 encloses the annular plate 112. An inner circumference of the border casing 2 includes a surrounding block 21 surroundingly disposed around the top plate 111. The surrounding block 21 protrudes beyond the top plate 111, and a gap s is formed between the surrounding block 21 and the top plate 111. The surrounding block 21 consists of silicone, rubber, or other soft materials.

More details are described as follows. The border casing 2 includes a surrounding frame 22. The surrounding block 21 is integrally and extendingly formed from an inner circumference of the surrounding frame 22. The border casing 2 consists of silicone, rubber, or other soft materials, and thereby the surrounding block 21 also consists of silicone, rubber, or other soft materials.

Additionally, an annular block 23 is extendingly formed from the inner circumference of the surrounding frame 22, and an annular groove 24 is formed between the surrounding block 21 and the annular block 23. The protruding annular portion 113 engages with the annular groove 24, so as to make the border casing 2 enclose the annular plate 112.

Moreover, the surrounding block 21 includes a first end 211, the annular block 23 has a second end 231. An interval h1 formed between the first end 211 and a bottom of the annular groove 24 is greater than an interval h2 formed between the second end 231 and the bottom of the annular groove 24. An inner edge of the surrounding block 21 has an inclined surrounding surface 212.

As shown in FIGS. 1 to 4, a combined state of the mobile power device 10 of the present invention utilizes the mobile power source 1. The mobile power source 1 includes the housing 11, and the housing 11 includes the top plate 111 and the annular plate 112. The border casing 2 encloses the annular plate 112. The inner circumference of the border casing 2 includes the surrounding block 21 surroundingly disposed around the top plate 111. The surrounding block 21 protrudes beyond the top plate 111, the gap s is formed between the surrounding block 21 and the top plate 111. Thereby, the surrounding block 21 can restrict a position of the portable electronic product, so that the portable electronic product is securely disposed corresponding to the mobile power source 1, so as to enhance the convenience in using the mobile power device.

Figure 5:
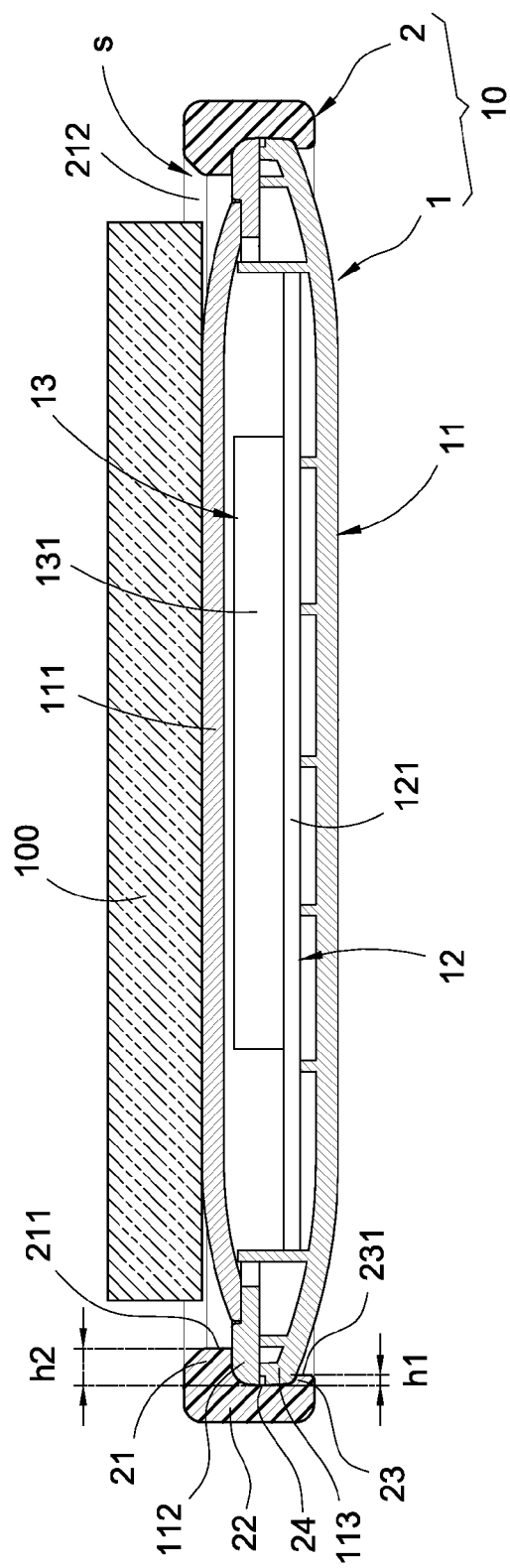
FIG. 5 is a schematic view of a use state of the mobile power device according to the present invention.
Figure 6:
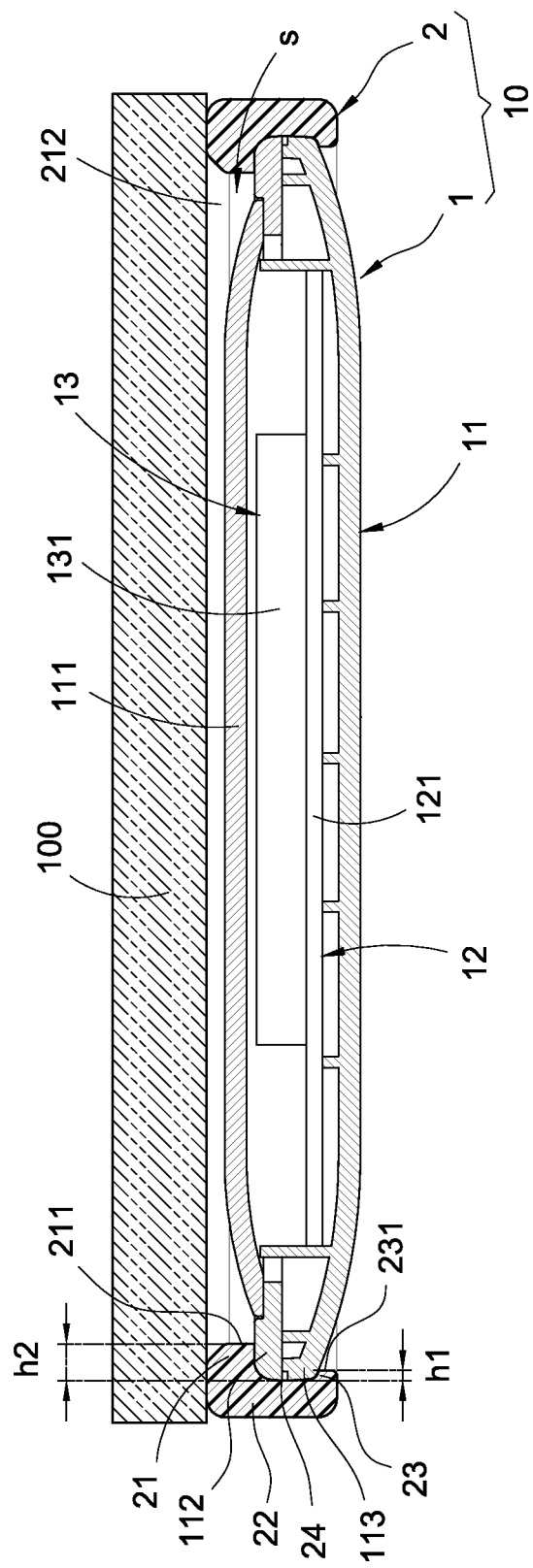
FIG. 6 is a schematic view of another use state of the mobile power device according to the present invention.

FIG. 5 and FIG. 6 show a use state of the mobile power device 10 according to the present invention. First, referring to FIG. 5, when a size of the portable electronic product 100 is smaller than a surface of the mobile power source 1, the portable electronic product 100 can be placed in the gap s and a position of the portable electronic product 100 is restricted by the surrounding block 21, so that the portable electronic product 100 or the mobile power device 10 are prevented from disconnecting or deviating, even if the portable electronic product 100 or the mobile power device 10 undergoes collisions or shaking.

The surrounding block 21 consists of silicone, rubber, or other soft materials, so that the surrounding block 21 can protect the portable electronic product 100 when the surrounding block 21 is surroundingly disposed around the outer circumference of the portable electronic product 100.

Moreover, as shown in FIG. 6, when the size of the portable electronic product 100 is larger than the surface of the mobile power source 1, the portable electronic product 100 is placed on the surrounding block 21 and is pressed in a direction toward the gap s. Since the surrounding block 21 consists of silicone, rubber, or other soft materials, the air in the gap s can be evacuated from around the surrounding block 21, and, in the meanwhile, the surrounding block 21 is sucked to attach to the surface of the portable electronic product 100, so that the gap s is in a vacuum state, and eventually the portable electronic product 100 is sucked to be securely attached to the surrounding block 21, and thereby the mobile power device 10 and the portable electronic product 100 are prevented from disconnecting or deviating when the portable electronic product 100 or the mobile power device 10 undergoes collisions or shaking.

Therefore, under the circumstance that the mobile power source 1 is the wireline mobile power source, it is not easy for the transmission cable to be disconnected from the mobile power device or the portable electronic product when the transmission cable is heavily shaken. Alternatively, under the circumstance that the mobile power source 1 is the wireless mobile power source, it is not easy for the portable electronic product to deviate or be misplaced with respect to the inductive coil. Accordingly, the mobile power device 10 and the portable electronic product 100 are prevented from having ineffective charging or falling to the ground, and thereby enhancing the convenience in using the mobile power device 10 and enhancing charging efficiency.

Furthermore, the surrounding block 21 is integrally and extendingly formed from the inner circumference of the surrounding frame 22, and the border casing 2 consists of silicone, rubber, or other soft materials, and, hence, the air in the gap s can be evacuated from around the border casing 2, so as to enhance the ability of the surrounding block 21 to suck and attach to the portable electronic product 100.

Further, the surrounding block 21 has a first end 211, the annular block 23 has a second end 231. An interval h1 formed between the first end 211 and the bottom of the annular groove 24 is larger than an interval h2 formed between the second end 231 and the bottom of the annular groove 24, so that a contact surface where the surrounding block 21 makes contact with the mobile power source 1 is larger than a contact surface where the annular block 23 makes contact with the mobile power source 1. Therefore the air in the gap s can be easily evacuated out from around the annular block 23, but the air outside is not easy to flow into the gap s from around the surrounding block 21, thereby enhancing the ability of the surrounding block 21 to suck and attach to the portable electronic product 100.

Moreover, an inner edge of the surrounding block 21 has an inclined surrounding surface 212, and the top plate 111 is an arc-shaped protruding plate, and thereby an introducing airflow is formed at one side of the inclined surrounding surface 212 or the top plate 111 and flows to an airflow passageway where the surrounding block 21 closely contacts with the mobile power source 1, so as to introduce the air in the gap s to be evacuated out from around the annular block 23, and, as a result, the surrounding block 21 more easily sucks and attaches to the portable electronic product 100.

In summary, the mobile power device having the border casing according to the present invention certainly can achieve the anticipated objects and improve the defects of the traditional techniques, and completely meet the requirements of patentability, namely industrial applicability, novelty, and non-obviousness. Therefore, a request to patent the present invention is filed according to patent laws. Examination is kindly requested, and allowance of the present application is solicited to protect the rights of the inventor.

What is claimed is:

1. A mobile power device having a border casing, comprising:
    a mobile power source (1) including a housing (11), the housing (11) including a top plate (111) and an annular plate (112); and
    a border casing (2) enclosing the annular plate (112), an inner circumference of the border casing (2) including a surrounding block (21) surroundingly disposed around the top plate (111), the surrounding block (21) protruding beyond the top plate (111), a gap (s) being formed between the surrounding block (21) and the top plate (111);
    wherein the surrounding block (21) consists of a soft material, and the soft material is silicone or rubber;
    wherein the border casing (2) includes a surrounding frame (22), the surrounding block (21) is integrally and extendingly formed from an inner circumference of the surrounding frame (22), the border casing (2) consists of a soft material, and the soft material is silicone or rubber;
    wherein the annular plate (112) extendingly forms a protruding annular portion (113), the inner circumference of the surrounding frame (22) extends to form an annular block (23), an annular groove (24) is formed between the surrounding block (21) and the annular block (23), and the protruding annular portion (113) engages with the annular groove (24).

2. The mobile power device having the border casing of claim 1, wherein an inner edge of the surrounding block (21) has an inclined surrounding surface (212).

3. The mobile power device having the border casing of claim 1, wherein the top plate (111) is an arc-shaped protruding plate.

4. The mobile power device having the border casing of claim 1, wherein the mobile power source (1) further comprises a power supply module (12) and a wireless charging module (13), the power supply module (12) and the wireless charging module (13) are accommodated inside the housing (11), the power supply module (12) includes a printed circuit board (121), the wireless charging module (13) includes an inductive coil (131), and the inductive coil (131) is electrically connected to the printed circuit board (121).

5. The mobile power device having the border casing of claim 1, wherein the surrounding block (21) has a first end (211), the annular block (23) has a second end (231), and an interval (h1) from the first end (211) to a bottom of the annular groove (24) is greater than an interval (h2) from the second end (231) to the bottom of the annular groove (24).

6. The mobile power device having the border casing of claim 1, wherein an inner edge of the surrounding block (21) has an inclined surrounding surface (212).

7. The mobile power device having the border casing of claim 1, wherein the top plate (111) is an arc-shaped protruding plate.

8. The mobile power device having the border casing of claim 1, wherein the mobile power source (1) further comprises a power supply module (12) and a wireless charging module (13), the power supply module (12) and the wireless charging module (13) are accommodated inside the housing (11), the power supply module (12) includes a printed circuit board (121), the wireless charging module (13) includes an inductive coil (131), and the inductive coil (131) is electrically connected to the printed circuit board (121).

* * * * *